United States Patent [19]
Auciello et al.

[11] Patent Number: 5,453,661
[45] Date of Patent: Sep. 26, 1995

[54] THIN FILM FERROELECTRIC FLAT PANEL DISPLAY DEVICES, AND METHODS FOR OPERATING AND FABRICATING SAME

[75] Inventors: Orlando H. Auciello, Cary; Gary E. McGuire, Chapel Hill, both of N.C.

[73] Assignee: MCNC, Research Triangle Park, N.C.

[21] Appl. No.: 228,116

[22] Filed: Apr. 15, 1994

[51] Int. Cl.⁶ .................................................. H01J 23/34
[52] U.S. Cl. .................... 315/1; 315/169.3; 313/497; 313/500; 313/503; 313/505
[58] Field of Search .................. 315/169.3; 313/491, 313/497, 498, 500, 502, 503, 505; 437/21, 29, 83, 84

[56] References Cited

U.S. PATENT DOCUMENTS

| | | | |
|---|---|---|---|
| 4,577,133 | 3/1986 | Wilson | 313/422 X |
| 4,850,677 | 7/1989 | Okumura | 350/333 |
| 5,131,065 | 7/1992 | Briggs et al. | 313/497 X |
| 5,164,799 | 11/1992 | Uno | 313/509 |
| 5,170,092 | 12/1992 | Tomii et al. | 313/310 |
| 5,216,324 | 6/1993 | Curtin | 313/495 |
| 5,317,236 | 5/1994 | Zavracky et al. | 315/169.3 |
| 5,384,517 | 1/1995 | Uno | 315/169.3 |

FOREIGN PATENT DOCUMENTS 1-93088  4/1989  Japan .

OTHER PUBLICATIONS

*Electroluminescent Displays*, L. E. Tannas, Jr., Chapter 8 of *Flat-Panel Displays and CRTs*, edited by L. E. Tannas, Jr., Van Nostrand Reinhold Publisher, New York, 1985, pp. 237–284.

*Time–Dependent Electron Emission from Ferroelectrics by External Pulsed Electric Fields*, H. Gundel et al., J. Appl. Phys. 69(2), 15 Jan., 1991, pp. 975–982.

*Pulsed Emission Characteristics of Ferroelectrics Cathode Under Two Exciting Modes*, Z. En–guan et al., preprint (1993).

*Electron–Beam Diodes Using Ferroelectric Cathodes*, J. D. Ivers, J. Appl. Phys. 73(6), 15 Mar., 1993, pp. 2667–2671.

*Electron Emission From Ferroelectric Materials*, G. Rosenman et al., J. Appl. Phys. 73(4), 15 Feb., 1993, pp. 1904–1908.

*Field–Excited Electron Emission from Ferroelectric Ceramic in Vacuum*, J. Asano et al., Japanese Journal of Applied Physics, vol. 31, Part 1, 1992, pp. 3098–3101.

*Electron Emission into Vacuum from lead–Zirconate–Titanate Ferroelectric Ceramics Induced by Polarization Reversal*, J. Asano et al., Jpn. J. Appl. Phys., vol. 32 (1993), PT. 1, No. 113, pp. 396–398.

*Field–Excited Electron Emission from Lanthanum–Doped, Barium–Strontium–Titanate Ceramics*, J. Handerek et al., Ferroelectrics, 1992, vol. 128, pp. 43–48.

*Ferroelectric Cathode Measurements*, S. E. Sampayan et al., preprint (1993).

(List continued on next page.)

Primary Examiner—Robert J. Pascal
Assistant Examiner—Haissa Philogene
Attorney, Agent, or Firm—Bell, Seltzer, Park & Gibson

[57] ABSTRACT

A flat panel display includes a ferroelectric thin film between first and second spaced apart electrodes. The ferroelectric thin film emits electrons upon application of a predetermined voltage between the first and second spaced apart electrodes. The electrons are emitted in an electron emission path and impinge upon a luminescent layer such as a phosphor layer, which produces luminescence upon impingement upon the emitter electrodes. The ferroelectric thin film is preferably about 2 μm or less in thickness and is preferably a polycrystalline ferroelectric thin film. More preferably, the thin ferroelectric film is a highly oriented, polycrystalline thin ferroelectric film. Most preferably, highly oriented ferroelectric thin film has a preferred (001) crystal orientation and is about 2 μm or less in thickness. A flat panel display may be formed of arrays of such display elements. Top and bottom electrodes or side electrodes may be used. The display may be formed using conventional microelectronic fabrication steps.

41 Claims, 12 Drawing Sheets

OTHER PUBLICATIONS

*Initial Studies of Ferroelectric Cathodes*, T. Cavazos et al., preprint (1993).

*Electron Emission by Nanosecond Switching in PLZT*, H. Gundel, Proceedings of the Third International Symposium on Integrated Ferroelectrics, University of Colorado Press, Colorado Springs, 1991, pp. 501–514.

*A Review of Composition–Structure–Property Relationships for PZT–Based Heterostructure Capacitors*, O. Auciello et al., Integrated Ferroelectrics, preprint, 1994.

*Physical Vapor Deposition of Multicomponent Dioxide Thin Films: Techniques, Basic Deposition Processes and Film Processing–Microstructure–Property Relationships*, O. Auciello et al., *Multicomponent and Multilayer Thin Films for Advanced Microtechnologies: Techniques, Fundamentals and Devices*, Kluwer Academic Publishers, 1993, pp. 151–208.

*Fatigue and Retention of $Pb(Zr_{0.53}Ti0.47)O_3$ Thin Film Capacitors With Pt and $RuO_2$ Electrodes*, Shareef et al., Integrated Ferroelectronics, preprint, 1994.

THIN FILM FERROELECTRIC FLAT PANEL DISPLAY DEVICES, AND METHODS FOR OPERATING AND FABRICATING SAME

FIELD OF THE INVENTION

This invention relates to display devices and more particularly to solid state display devices.

BACKGROUND OF THE INVENTION

The cathode ray tube (CRT) is the predominant display device for electronic systems such as computers and televisions, notwithstanding its many shortcomings. Among these shortcomings are the large spatial volume (footprint) occupied by a CRT, the high power supply voltages needed for the tube and the relatively short lifetime of the tube.

In recognition of these shortcomings, the art has heretofore proposed many alternative solid state displays. These displays are also referred to as flat panel displays. Flat panel displays include light emitting diode displays, liquid crystal displays, field emitter displays, and electroluminescent displays. Unfortunately, flat panel displays have their own limitations which prevent replacing a CRT for many applications.

For example, a field emitter display typically includes an array of field emission tips which emit electrons upon application of appropriate voltages thereto. The emitted electrons are caused to strike a luminescent material such as a phosphor to create a display. Unfortunately, field emitter displays typically require tens to hundreds of volts for electron emission, which makes it difficult to use these displays in many applications. The electron emission tips also typically need to be surrounded by a very high vacuum at least $10^{-5}$ Torr and often as high as $10^{-8}$–$10^{9}$ Torr in order to prevent degradation of the tips. Such high vacuums are difficult to maintain in the small volume enclosing the emitters.

Electroluminescent displays are formed by applying an electric field across a luminescent material, typically a phosphor, in sufficient magnitude to cause avalanche breakdown of the phosphor. The light generated by recombination of electron-hole pairs produced by the breakdown can be tuned in wavelength by the addition of various impurity ions to the phosphor. A history and survey of electroluminescent displays is described in Chapter 8 of *Flat-Panel Displays and CRTs*, edited by L. E. Tannas, Jr., Van Nostrand Reinhold Publisher, New York, 1985, entitled *Electroluminescent Displays* by L. E. Tannas, Jr., pp. 237–284. As shown, in the AC thin film electroluminescence display the luminescent (phosphor) layer is typically surrounded by dielectric layers such as amorphous thin film of, for example, aluminum oxide.

It is also known that ferroelectric materials can emit electrons. As is well known to those having skill in the art, ferroelectric materials are polar dielectrics that undergo a change of spontaneous polarization under the influence of an applied electric field. Thus, it has been proposed to utilize bulk ferroelectric materials of about 1 mm in thickness as an electron emitter. See for example *Time-Dependent Electron Emission From Ferroelectrics by External Pulsed Electric Fields*, H. Gundel et al., J. Appl. Phys. 69(2), 15 Jan. 1991, pp. 975–982; *Pulsed Emission Characteristics of Ferroelectric Cathodes Under Two Exciting Modes*, Z. En-guan et al., preprint (1993); *Electron-Beam Diodes Using Ferroelectric Cathodes*, J. D. Ivers, J. Appl. Phys. 73(6), 15 Mar., 1993, pp. 2667–2671; *Electron Emission From Ferroelectric Materials*, G. Rosenman et al., J. Appl. Phys. 73(4), 15 Feb. 1993, pp. 1904–1908; *Field- Excited Electron Emission from Ferroelectric Ceramic in Vacuum*, J. Asano et al., Japanese Journal of Applied Physics, Vol. 31, Part 1, 1992, pp. 3098–3101; *Electron Emission into Vacuum from Lead-Zirconate-Titanate Ferroelectric Ceramics Induced by Polarization Reversal*, J. Asano et al., Jpn. J. Appl. Phys., Vol. 32 (1993) PT. 1, No. 113, pp. 396–398; *Field-Excited Electron Emission from Lanthanum-Doped, Barium- Strontium-Titanate Ceramics*, J. Handerek et al., *Ferroelectrics*, 1992, Vol. 128, pp. 43–48; *Ferroelectric Cathode Measurements*, S. E. Sampayan et al., preprint (1993); *Initial Studies of Ferroelectric Cathodes*, T. Cavazos et al., preprint (1993); and *Electron Emission by Nanosecond Switching in PLZT*, H. Gundel, Proceedings of the Third International Symposium on Integrated Ferroelectrics, University of Colorado Press, Colorado Springs, 1991, pp. 501–514. Unfortunately, these ferroelectric electron emitters require operating voltages on the order of thousands of volts to induce electron emission. These high voltages preclude many display applications.

SUMMARY OF THE INVENTION

It is therefore an object of the present invention to provide improved flat panel display devices and methods.

It is another object of the present invention to provide display devices and methods which do not require a high vacuum environment.

It is yet another object of the present invention to provide flat panel display devices and methods which do not require high voltages.

These and other objects are provided, according to the present invention, by a flat panel display which includes a ferroelectric thin film between first and second spaced apart electrodes. The ferroelectric thin film emits electrons upon application of a predetermined voltage between the first and second spaced apart electrodes. The electrons are emitted in an electron emission path and impinge upon a luminescent layer, such as a phosphor layer, which produces luminescence upon impingement of the emitted electrons thereon. The ferroelectric thin film is preferably about 2 µm or less in thickness and is preferably a polycrystalline ferroelectric thin film. More preferably, the thin ferroelectric film is a highly oriented polycrystalline thin ferroelectric film. Most preferably, the highly oriented ferroelectric thin film has a (001) crystal orientation, and is about 2 µm or less in thickness. In this configuration, the predetermined voltage for causing electron emission is about 50 volts or less.

According to another aspect of the present invention, a thin film ferroelectric display also includes a third electrode adjacent to the phosphor layer. Upon application of an appropriate voltage thereto, the third electrode accelerates the emitted electrons from the ferroelectric thin film to the phosphor layer. The phosphor layer may be placed directly on the thin film ferroelectric layer in which case electrons originating at the ferroelectric/phosphor layer interface would be injected directly into the phosphor layer. Alternatively, the phosphor layer may be spaced apart from the thin ferroelectric film to define a gap therebetween, and emitted electrons may be injected across the gap into the phosphor layer.

Typically, an array of thin film ferroelectric display elements are used to form a flat panel display. The flat panel display includes first and second electrode arrays, which are spaced apart from one another to define an array of electrode pairs such that the electrode pairs produce an electric field therebetween upon application of a predetermined voltage therebetween. The flat panel display also includes a ferroelectric thin film between each of the electrode pairs, such that the ferroelectric thin film emits electrons therefrom in an electron emission path for each electrode pair, upon application of the predetermined voltage between the electrode pair. A luminescent layer is present in the electron emission path of each electrode pair. The electrodes in the first and second arrays may extend in a direction along the respective first and second arrays to form top and bottom electrode pairs. The electrodes in the second electrode array may be patterned electrodes so that the electron emission path from each electrode pair passes through the corresponding patterned second electrode. Alternatively, each of the electrodes in the first and second arrays may extend in a direction transverse to the respective first and second arrays, to form side electrode pairs. In this case, the electron emission path from each electrode pair is transverse to the first and second electrodes of the corresponding electrode pair.

A thin film ferroelectric display according to the present invention may be operated using low voltages which are typically used in computer and electronic systems. Moreover, a thin film ferroelectric display according to the invention can tolerate lower vacuums, on the order of about $10^{-2}$–$10^{-3}$ Torr, between the ferroelectric thin film and a spaced apart luminescent (phosphor) layer. High vacuums are not required. A thin film ferroelectric display according to the present invention can also operate above room temperature (up to about 100° C.) and is resistant to physical deterioration due to the resistance of the ferroelectric material to chemical reaction and/or mechanical deformation.

A visible image displaying method according to the invention applies a polarization switching voltage of about 50 volts or less across a ferroelectric thin film of about 2 μm or less in thickness, to produce electron emission from the ferroelectric thin film. Electric fields of more than about 20 kV/cm may be achieved. The emitted electrons impinge onto a luminescent layer such as a phosphor to produce luminescence. A low voltage, high reliability displaying method is thereby produced.

Flat panel displays according to the present invention may be fabricated using microelectronic fabrication steps. In particular, a first electrode array is formed on a substrate and a polycrystalline and preferably highly oriented ferroelectric thin film is formed on the first electrode array. A second electrode array is formed on the polycrystalline and preferably highly oriented ferroelectric thin film to define an electron emission path from the polycrystalline and preferably highly oriented ferroelectric thin film upon application of the predetermined voltage between the first and second electrode arrays. Finally, a luminescent layer is formed in the electron emission path such that the luminescent layer produces luminescence upon impingement of electrons thereon.

When the first and second electrode arrays are bottom and top electrode arrays, relative to the substrate, the first electrode array is preferably blanket deposited on the substrate and then patterned, and the second electrode array is preferably blanket deposited and patterned on the ferroelectric layer opposite the first array. The ferroelectric layer may also be etched between adjacent electrodes of the second array to produce a discrete ferroelectric region for each display element.

When forming the first and second electrodes as side electrodes relative to the ferroelectric layer, a first connecting electrode array is formed on the substrate and the polycrystalline and preferably highly oriented ferroelectric thin film is formed on the first connecting electrode array. An array of first side electrodes is formed by etching a first array of vias in the ferroelectric thin film and then filling the first vias with conductive material which electrically contacts the first connecting electrode array. The second electrode array may be formed by etching a second array of vias in the ferroelectric thin film, and filling the second vias with conductive material which is insulated from the first electrode array.

Two alternative methods may be used to form the luminescent structure. In a first method, a luminescent layer, and an accelerating electrode if desired, are formed on a second substrate which is mounted adjacent to the ferroelectric thin film. The second substrate may be mounted adjacent and in direct contact with the ferroelectric thin film or may be mounted adjacent and spaced apart from the ferroelectric thin film. In an alternative method, the luminescent layer may be directly deposited on the existing structure in contact with the ferroelectric layer, without using a second substrate.

BRIEF DESCRIPTION OF THE DRAWINGS

FIGS. 5A–5M illustrate cross-sectional and top views of fourth and fifth embodiments of a flat panel display according to the present invention during intermediate fabrication steps.

DETAILED DESCRIPTION OF PREFERRED EMBODIMENTS

Figure 1:
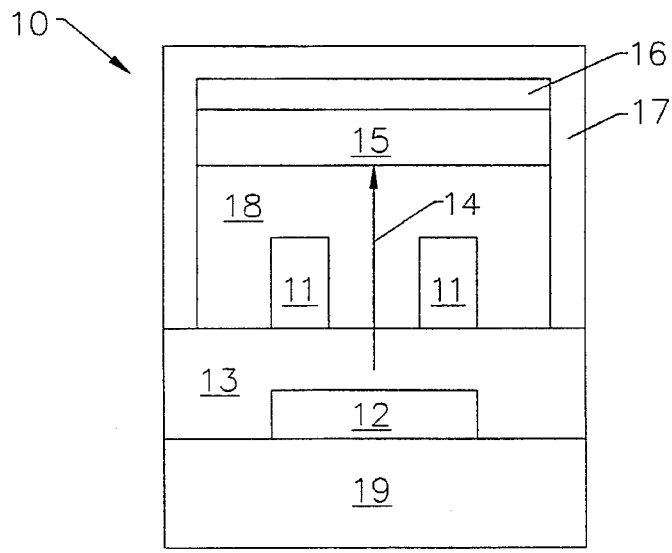
FIG. 1 illustrates a cross-sectional view of a flat panel display according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring now to FIG. 1, a cross-sectional view of a flat panel display according to the invention is illustrated. Display 10 may be thought of as a single element display. More typically, however, display 10 is a single display element (pixel) of a flat panel display which includes an array of display elements. Displays which include arrays of display elements will be described below.

As shown in FIG. 1, flat panel display 10 includes first and second spaced apart electrodes 12 and 11 respectively, and a ferroelectric thin film 13 between the first and second spaced apart electrodes. First electrode 12 is preferably formed on a substrate 19.

Ferroelectric thin film 13 is preferably a polycrystalline ferroelectric thin film, more preferably a highly oriented polycrystalline thin film, and most preferably a highly oriented polycrystalline thin film having (001) crystal orientation with respect to substrate 19. As is well known to those having skill in the art, polycrystalline ferroelectric material includes a plurality of ferroelectric crystalline grains. In a conventional polycrystalline ferroelectric thin film, the grains are oriented randomly. In a highly oriented polycrystalline film, substantially all of the grains are oriented in the same direction. As is well known to those having skill in the art, highly oriented polycrystalline ferroelectric thin films may be readily distinguished from randomly oriented films by X-ray diffraction, wherein the highly oriented (001) film shows one X-ray diffraction peak (001) and a randomly oriented film shows several peaks corresponding to other orientations such as (110) and (101). See an article by O. Auciello et al., entitled *A Review of Composition-Structure- Property Relationships for PZT-Based Heterostructure Capacitors*, Integrated Ferroelectronics, preprint, 1994. Other techniques for distinguishing highly oriented and randomly oriented polycrystalline ferroelectric thin films are well known to those having skill in the art.

In order to fabricate a highly oriented polycrystalline ferroelectric thin film 13, the substrate 19 and first electrode 12 are preferably chosen to have a crystalline structure which promotes highly oriented polycrystalline growth. Thus, for example, substrate 19 may be a magnesium oxide (MgO) substrate or an MgO layer formed on a silicon or other substrate. First electrode 12 may be platinum or $RuO_2$ or combinations thereof, or other metal or conductive metal oxide.

Ferroelectric thin film 13 may be any ferroelectric material such as lead zirconate titanate (PZT) or other well known ferroelectric materials. The fabrication of highly oriented ferroelectric thin films is well known to those having skill in the art and is described, or example, in a textbook entitled *Multicomponent and Multilayer Thin Films for Advanced Microtechnologies: Techniques, Fundamentals and Devices* edited by coinventor Auciello et al., published by Kluwer Academic Publishers, 1993, in a chapter entitled *Physical Vapor Deposition of Multicomponent Dioxide Thin Films: Techniques, Basic Deposition Processes and Film Processing-Microstructure-Property Relationships* by coinventor Auciello et al., pp. 151–208; and in a publication entitled *Fatigue and Retention of $Pb(Zr_{0.53}TiO.47)O_3$ Thin Film Capacitors With Pt and $RuO_2$ Electrodes* by Shareef et al., Integrated Ferroelectronics, preprint, 1994; and need not be described in detail herein.

Referring again to FIG. 1, ferroelectric thin film 13 is about 2 μm or less in thickness. Accordingly, electrons may be emitted from the ferroelectric thin film 13 in an electron emission path 14 upon application of polarization switching voltages in the range of about 50 volts or less between electrodes 11 and 12. A luminescent layer 15 such as a phosphor is placed in the electron emission path 14 so that the emitted electrons impinge thereon and produce luminescence in the luminescent layer 15.

As also shown in FIG. 1, a third electrode 16 may also be present for accelerating the electrons which are emitted from the thin film ferroelectric layer 13 into the luminescent layer 15. A support structure 17 maintains the luminescent layer 15 in spaced apart relation from the ferroelectric layer 13, thereby creating a gap 18 therebetween. The gap is preferably maintained under vacuum conditions at a pressure of less than about $10^{-3}$ Torr. This contrasts with conventional field emitter devices which require high minus vacuums on the order of $10^{-8}$–$10^{-9}$ Torr. In other embodiments described below, gap 18 is not present, and luminescent layer 15 is formed directly on ferroelectric material 13 and second electrode 11.

Figure 2A:
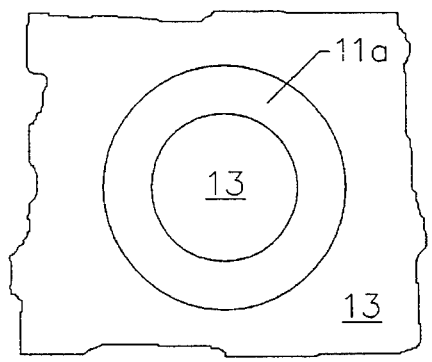
FIGS. 2A–2C illustrate top views of alternative embodiments of second electrodes according to the present invention.
Figure 2B:
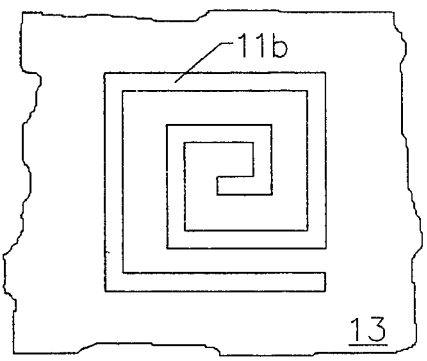
Figure 2C:
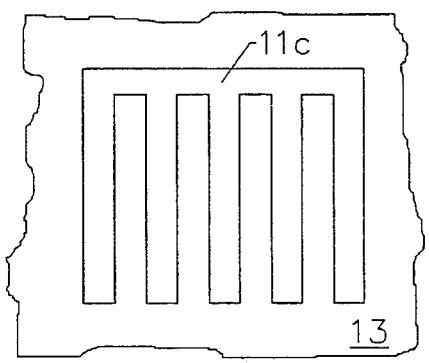

As shown in FIG. 1, the first single pixel electrode 12 is preferably a solid electrode. The second single pixel electrode 11 is preferably a patterned electrode as shown in FIG. 1. FIGS. 2A–2C illustrate top views of alternative embodiments of the second electrode 11. FIG. 2A illustrates a ring electrode 11a. FIG. 2B illustrates a spiral electrode 11b and FIG. 2C illustrates a finger electrode 11c. In all cases, the patterned second electrode 11 is used to support a voltage across the ferroelectric material while allowing electron emission from those areas which are not covered by the electrode material. Since the emission area is increased, more electrons are emitted, thereby producing a brighter display.

According to the present understanding of the phenomenon of electron emission from ferroelectric bulk materials, in a steady state, the ferroelectric appears neutral to its surrounding environment because any remnant polarization is immediately compensated by free charge carriers. Thus, surface charge densities of about 30 $\mu C/cm^2$ or higher can exist in a normal equilibrium state without affecting the surrounding environment. However, this charge equilibrium may be disturbed for short transient time, generating a surplus of charges at opposite faces of the affected volume. A mechanism which can change the polarization inside the material and which is fast enough not to be compensated instantaneously, results in a high potential at the surface. Under proper conditions, charged particles can be liberated and accelerated thereby. Preferably, conditions are chosen in order to achieve a surplus of negative charges at the emitting surface, resulting in electron emission. The electrons are drawn from energetically favorable levels in the material. These levels may be screening charges of electrons trapped by defects, or others.

A fast change of the spontaneous polarization due to a phase shift, and/or partial reversal of the spontaneous polarization induced by the application of high electric field pulses to a ferroelectric thin film is preferably used. A phase shift offers the advantage that after emission the ferroelectric material relaxes back to its initial state prior to the voltage pulse. Thus, no resetting is necessary. Reversal inside the ferroelectric phase may require active resetting, either by applying pulses with alternating polarity, or by pulsing from a low continuous potential level to the opposite polarity. The emission dynamics are strongly correlated to the actual material use, taking into account the kind of phase transition (first and second order), nucleation and domain wall motion, grain properties, defect concentration, and other known factors.

Referring now to FIGS. 3A–3I, a method of fabricating a second embodiment of a first flat panel display according to the invention will be described. Fabrication of a 5×5 array of display elements is illustrated. However, it will be understood by those having skill in the art that typically many more elements are fabricated in a single display.

Figure 3A:
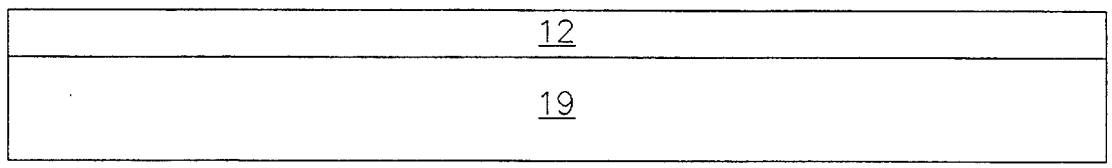
FIGS. 3A–3I illustrate cross-sectional and top views of a second embodiment of a flat panel display according to the present invention during intermediate fabrication steps.

As shown in FIG. 3A, first electrode 12 is formed on a suitable substrate 19 using techniques well known to those having skill in the art. For example, a thin film of platinum (or any other metal) or a multicomponent oxide material (YBaCuO, LaSrCoO, $RuO_2$, or any other conducting oxide)

with a perovskite or other structure similar to that of the ferroelectric thin film, is deposited on an appropriate substrate 19. The substrate 19 can be any thin film or bulk material (such as MgO or SrTiO) or other material on which an appropriate template layer is deposited to yield suitable lattice matching and serve as a diffusion barrier to avoid possible destructive interactions between the substrate and the ferroelectric layer. Semiconductors (e.g., Si, GaAs) are possible substrate materials of the latter type.

Prior to the deposition of the electrode layer 12 on the latter substrate materials, a diffusion barrier may be needed to avoid interdiffusion of the electrode layer 12, and the substrate 19 at the temperatures needed (400°–600° C.) to produce an epitaxial electrode layer, which has been proven to be suitable to obtain optimized polarization hysteresis loops and reduced or negligible polarization fatigue. The use of oxide electrodes may be necessary to obtain electrode/ferroelectric/electrode structures that can sustain many voltage cycles without reduction of the material polarization, to produce a long lifetime electron emitter.

Figure 3B:
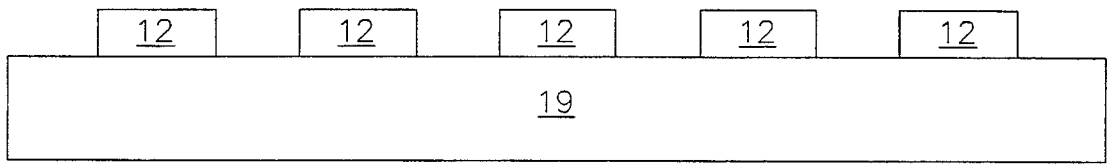
Figure 3C:
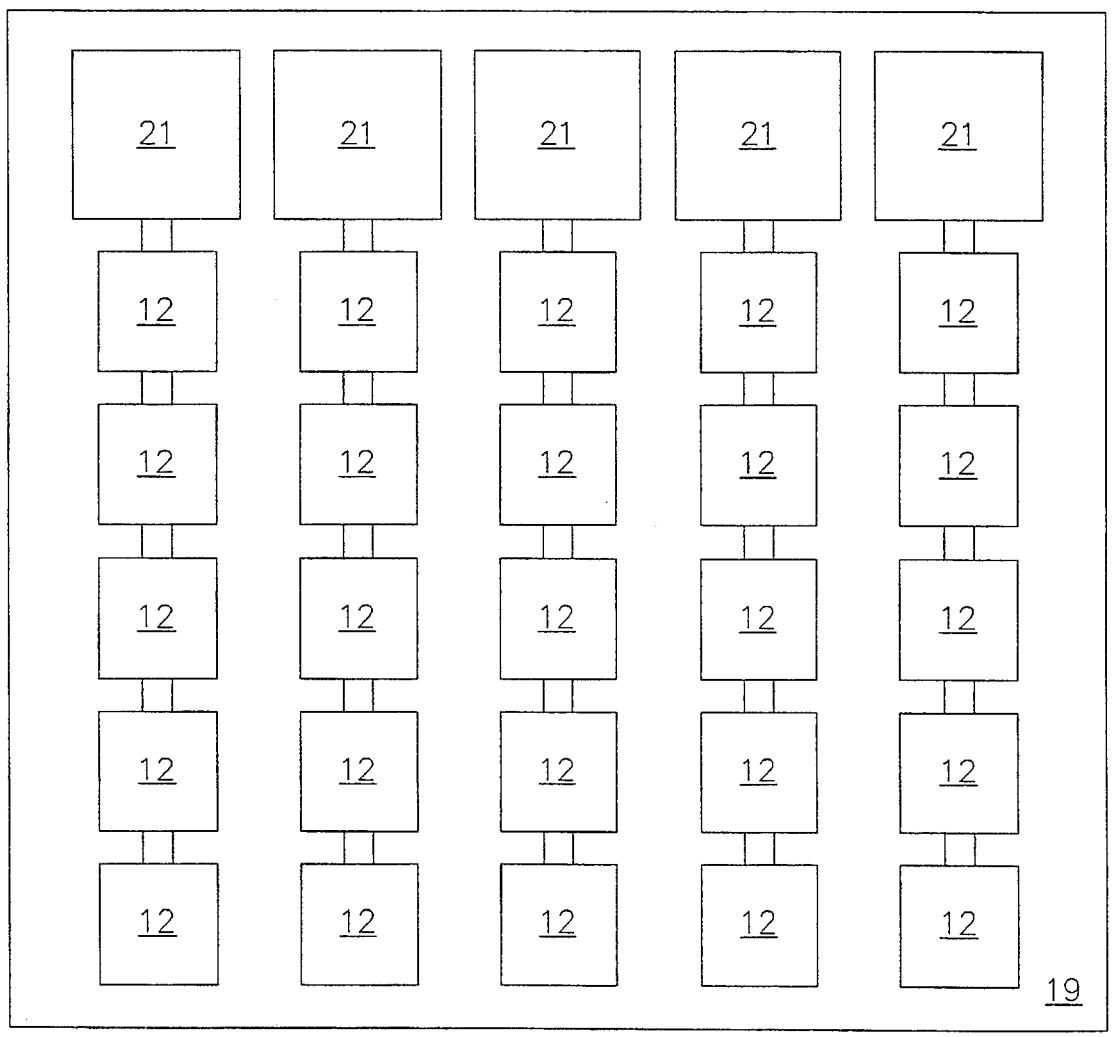

As shown in FIG. 3B, first electrode 12 is patterned to form first electrode array. FIG. 3C illustrates a top view of the first electrode array. As illustrated, interconnected electrode columns are formed. Each column of electrodes includes an associated first contact pad 21. Thus, a column of first electrodes 12 is energized by applying an appropriate voltage to the associated first contact pad 21. As shown in FIG. 3C, each first electrode 12 is a square shape. However, other shapes may be used.

As yet another alternative, first electrode 12 need not be patterned as shown in FIG. 2B. Rather, an unpatterned electrode layer can be formed across substrate 19. However, conventionally in a flat panel display, the bottom electrodes form a plurality of column electrodes and the top electrodes form a plurality of row electrodes, or vice versa, so that a particular display element may be energized by energizing the appropriate row and column. Thus, the first and second electrode arrays define an array of electrode pairs which produce an electric field therebetween upon application of a predetermined voltage therebetween.

Figure 3D:
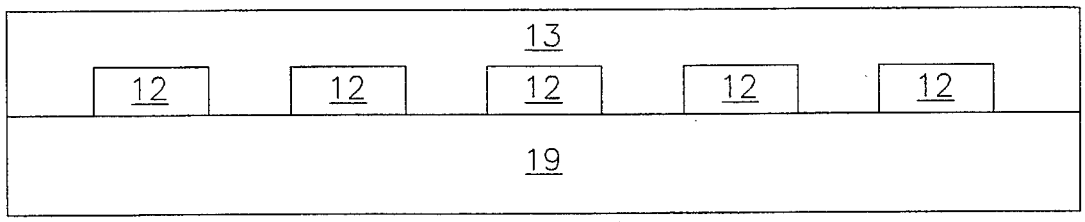

Referring now to FIG. 3D, a thin film ferroelectric layer 13 is deposited and planarized on substrate 19 and first electrodes 12 using techniques well known to those having skill in the art. For example, a ferroelectric thin film is deposited by any of the techniques currently used, i.e., sputter-or laser ablation-deposition, sol-gel, or chemical vapor deposition. Any ferroelectric material capable of sustaining prolonged polarization switching under AC voltage excitation can be used for this application, such as $Pb(Zr_xTi_{1-x})O_3$, $PbLa_x(Zr_yTi_{1-y})O_3$, $PbTiO_3$ or any other ferroelectric material.

Figure 3E:
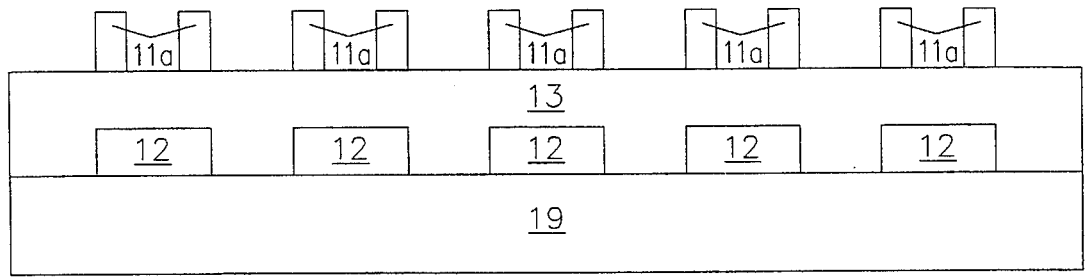
Figure 3F:
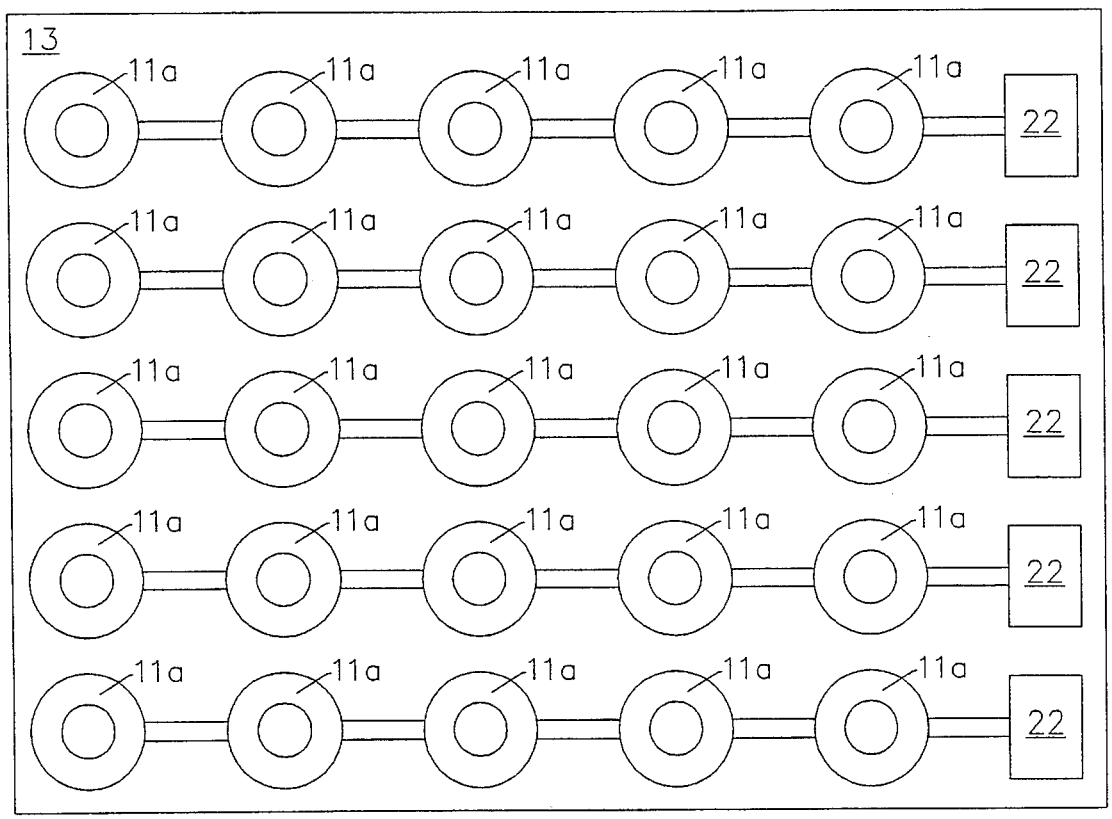

As shown in FIG. 3E, the second electrodes are deposited and patterned to form a second electrode array. FIG. 3F illustrates a top view of the second electrodes. As shown, the second electrodes can be patterned in different configurations, such as the configurations shown in FIGS. 2A, 2B, and 2C, or other patterns. The second electrodes 11a (or 11b or 11c) are patterned so as to expose a large area of ferroelectric material adjacent to the electrode material to provide increased emission. As also shown in FIG. 3F, each row of second electrodes is connected to a second contact 22 so that excitation of the appropriate second contact pad 22 and an appropriate first contact pad 21 of FIG. 3C uniquely energizes an electrode pair, and thereby energizes a display element.

Figure 3G:
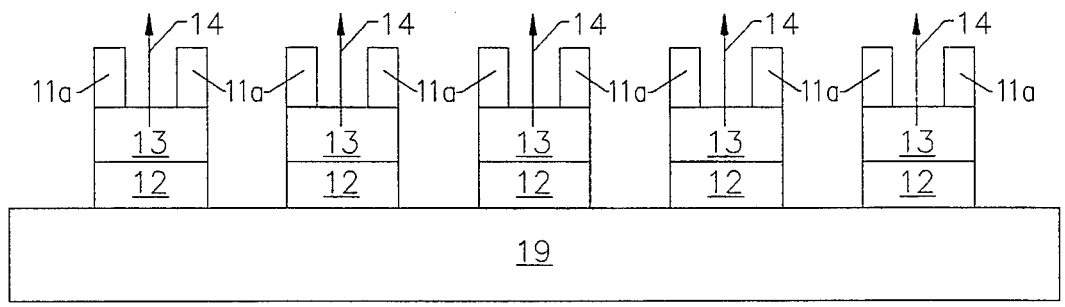

Referring now to FIG. 3G, the ferroelectric material between the adjacent electrodes in the first array is etched. Etching of the ferroelectric layer 13 is an optional step which may produce sharper emissions by preventing emissions between adjacent second electrodes 11a, and restricting emissions to through the second electrodes 11a, in the emission paths 14. However, alternatively, the ferroelectric layer 13 need not be patterned between adjacent electrodes. Etching of the ferroelectric layer 13 typically needs to be done to expose the contact pads 21 of the first electrode 12.

Figure 3H:
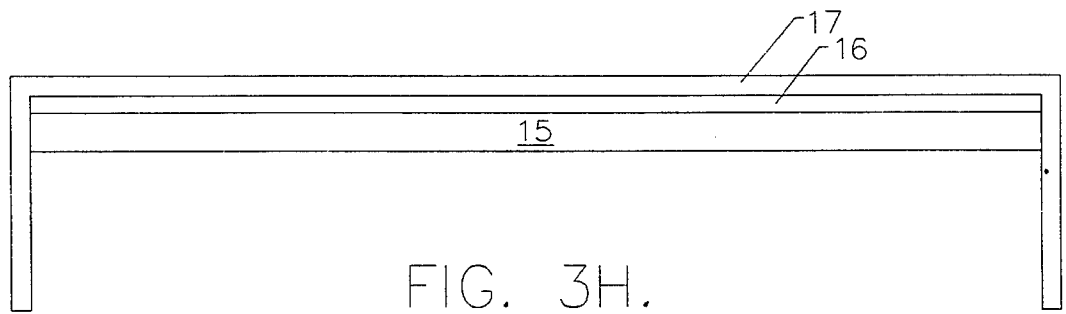

Referring now to FIG. 3H, a third (accelerator) electrode 16 is deposited on a glass or other transparent second substrate 17. As shown in FIG. 3H, the accelerator electrode is a blanket (unpatterned) electrode. However, the accelerator electrode may be patterned in rows and/or columns in the patterns shown in FIG. 3C or 3F, or in other row and column patterns, so that only a row or column of accelerator electrodes is energized upon excitation of a selected display element. Upon application of an appropriate voltage to the third electrode 16 the electrons which are emitted from the ferroelectric layer are accelerated.

It will be understood by those having skill in the art that a patterned third electrode 16 may be preferred for improved operation of the flat panel display because an unpatterned third electrode may divert electrons from the paths 14. Thus, a patterned accelerator electrode may enhance the definition of the display element by accelerating electrodes only in a direction orthogonal to the substrate 19. However, a patterned third electrode may be more difficult to align to the rest of the display.

Figure 3I:
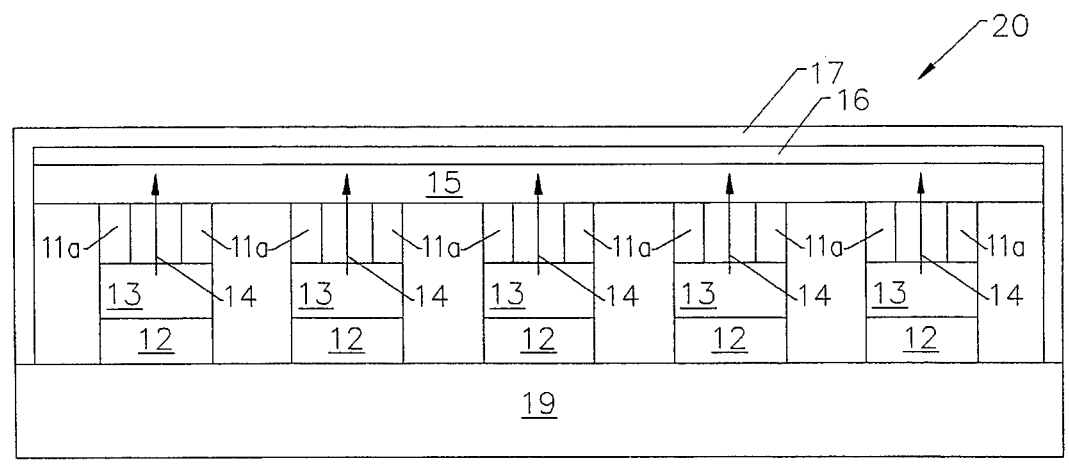

Still referring to FIG. 3H, a luminescent layer 15 such as a phosphor is deposited on third electrode 16. The design and fabrication of phosphor layers are well known to those having skill in the art and need not be described further herein. Any luminescent phosphor can be used. Then, as shown in FIG. 3I, the second substrate 17 is joined to substrate 19 using well known techniques. They are preferably joined under vacuum of at least $10^{-3}$ Torr. However, atmospheric pressure, or other gas environments may be used. Accordingly, the resultant flat panel display 20 includes a plurality of display elements each of which includes a thin ferroelectric layer 13 which emits electrons onto phosphor 15 along an electron emission path 14 upon energization of appropriate row and column contacts 21 and 22.

Referring now to FIGS. 4A–4J, a method for fabricating a third embodiment of a thin film ferroelectric display device according to the invention is disclosed. This embodiment differs from that shown in FIGS. 3A–3I, among other reasons, because the phosphor layer 15 is formed directly upon the second electrodes and on the ferroelectric layer 13, rather than being formed on a second substrate. Moreover, the ferroelectric layer is not patterned.

Figure 4A:
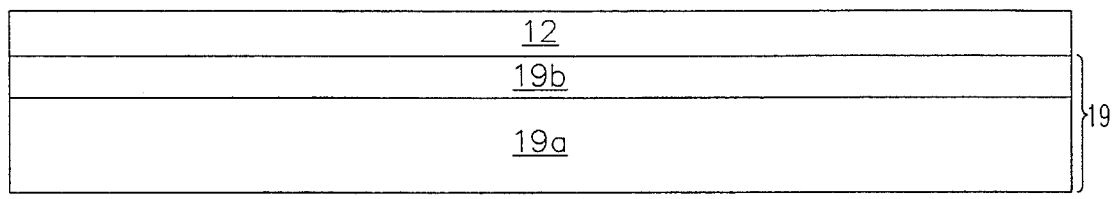
FIGS. 4A–4K illustrate cross-sectional and top views of a third embodiment of a flat panel display according to the present invention during intermediate fabrication steps.
Figure 4B:
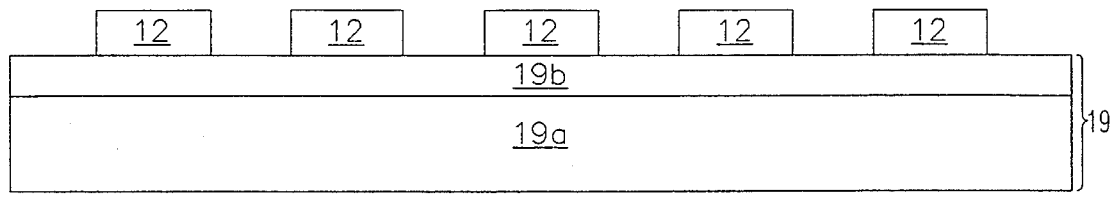
Figure 4C:
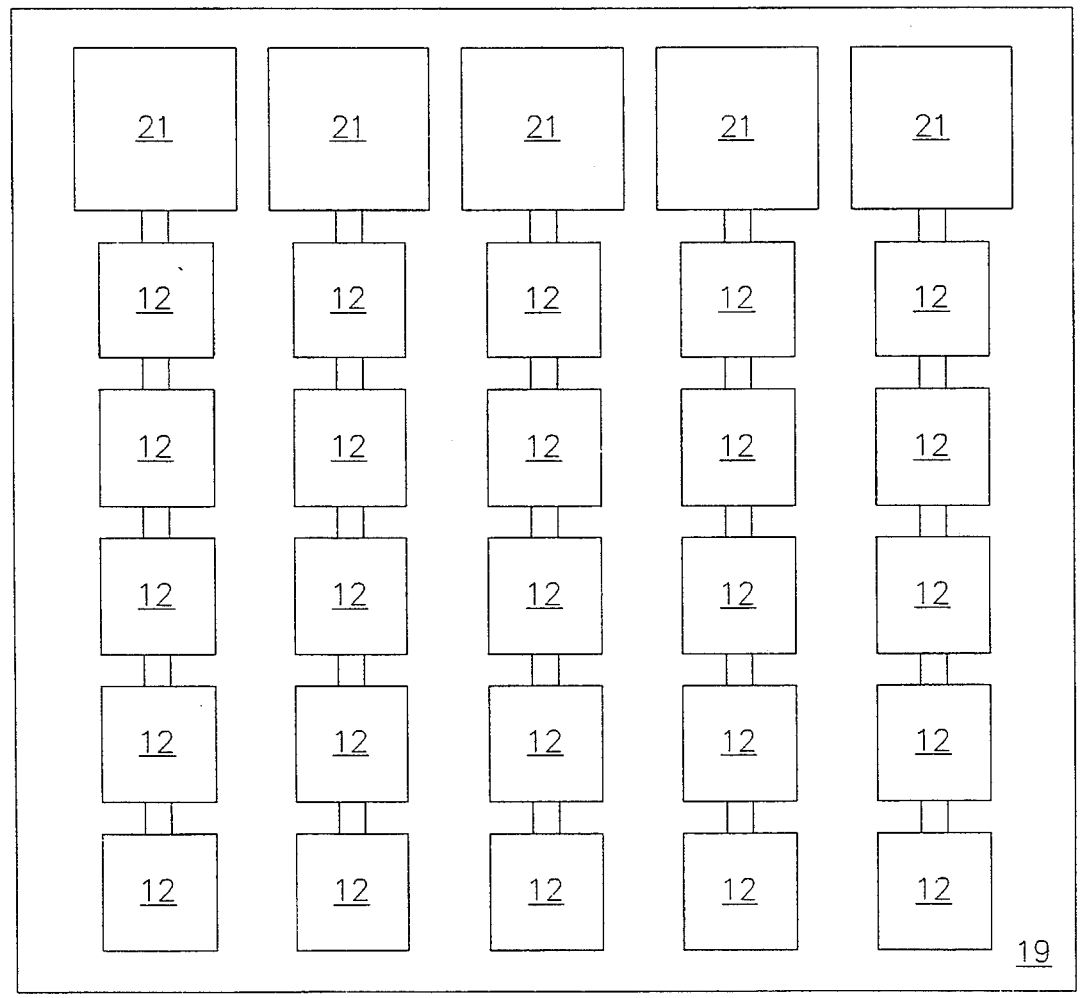
Figure 4D:
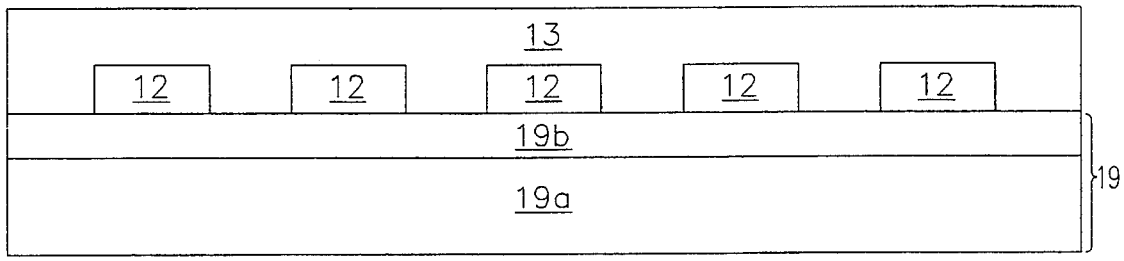
Figure 4E:
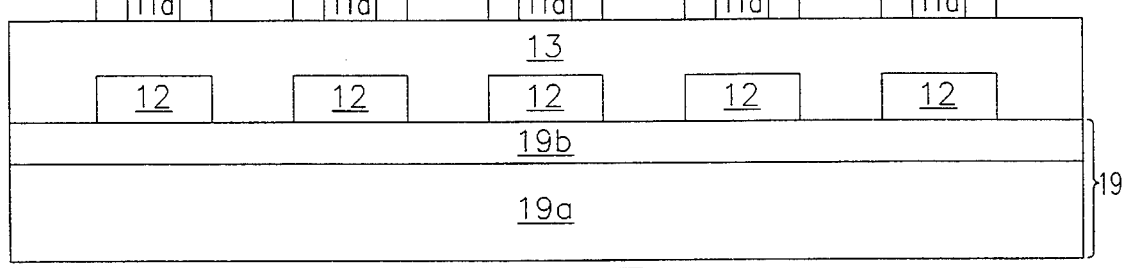
Figure 4F:
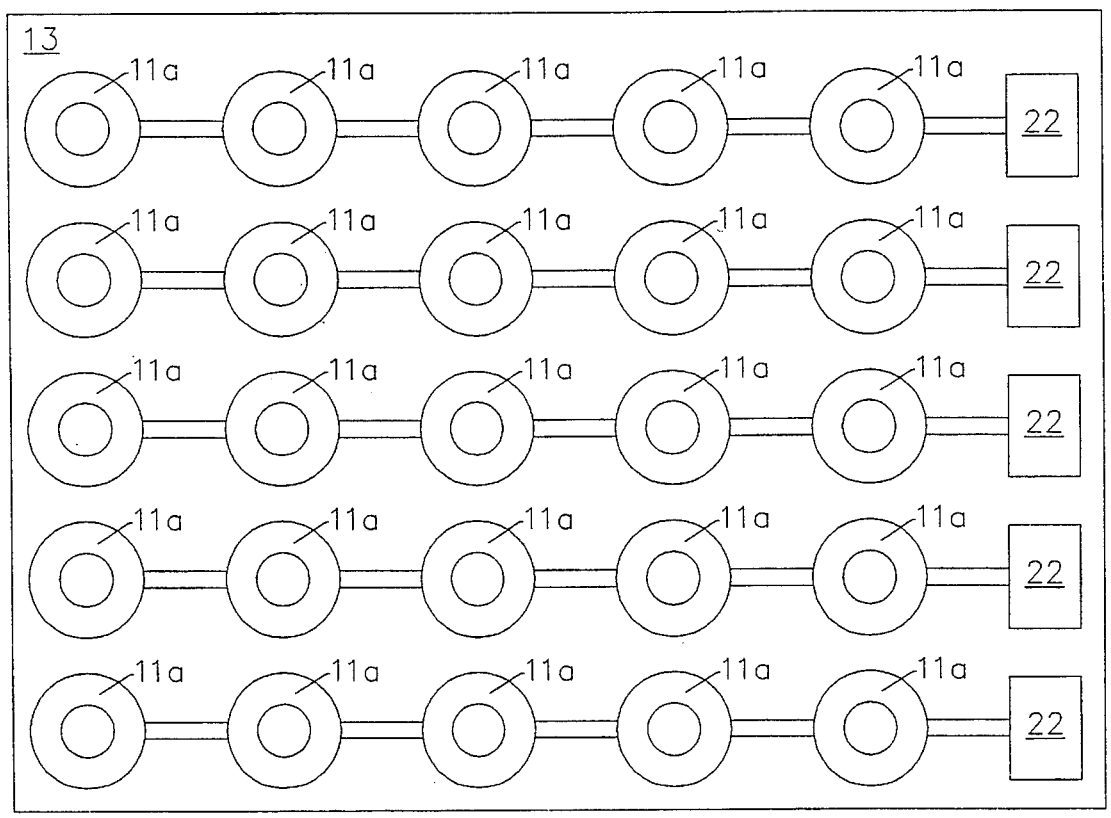

In particular, referring to FIG. 4A, a first electrode 12 is formed on substrate 19 as was described in connection with FIG. 3A. However, as shown in FIG. 4A, the substrate 19 includes a silicon or other substrate 19a and a buffer layer 19b such as MgO upon which a first electrode 12 is formed. FIGS. 4B–4F illustrate similar operations to those described in FIGS. 3B–3F and need not be described further.

Figure 4G:
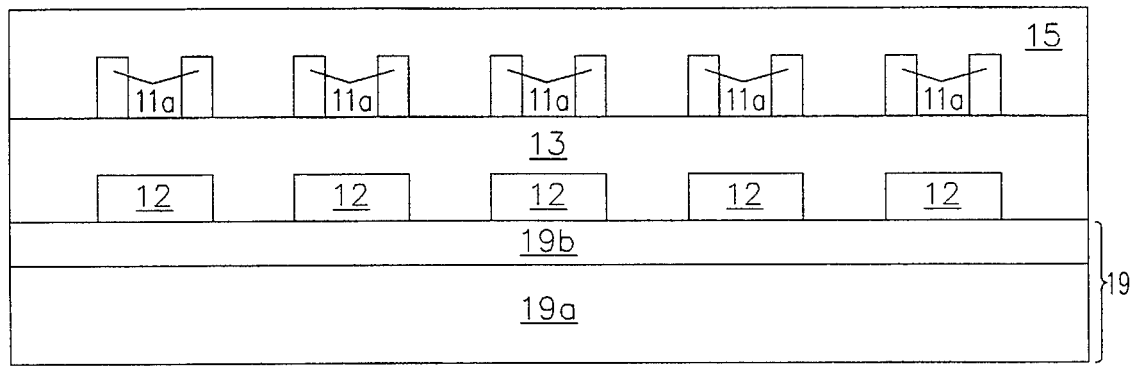
Figure 4H:
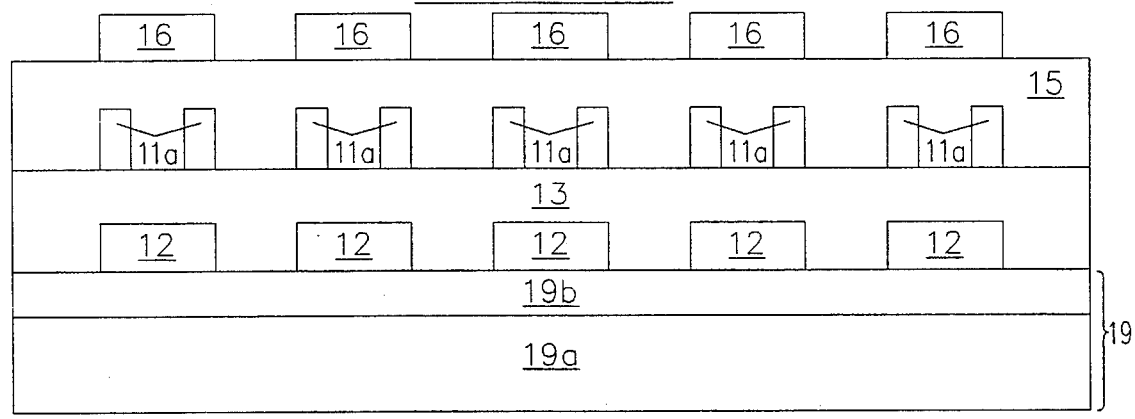
Figure 4I:
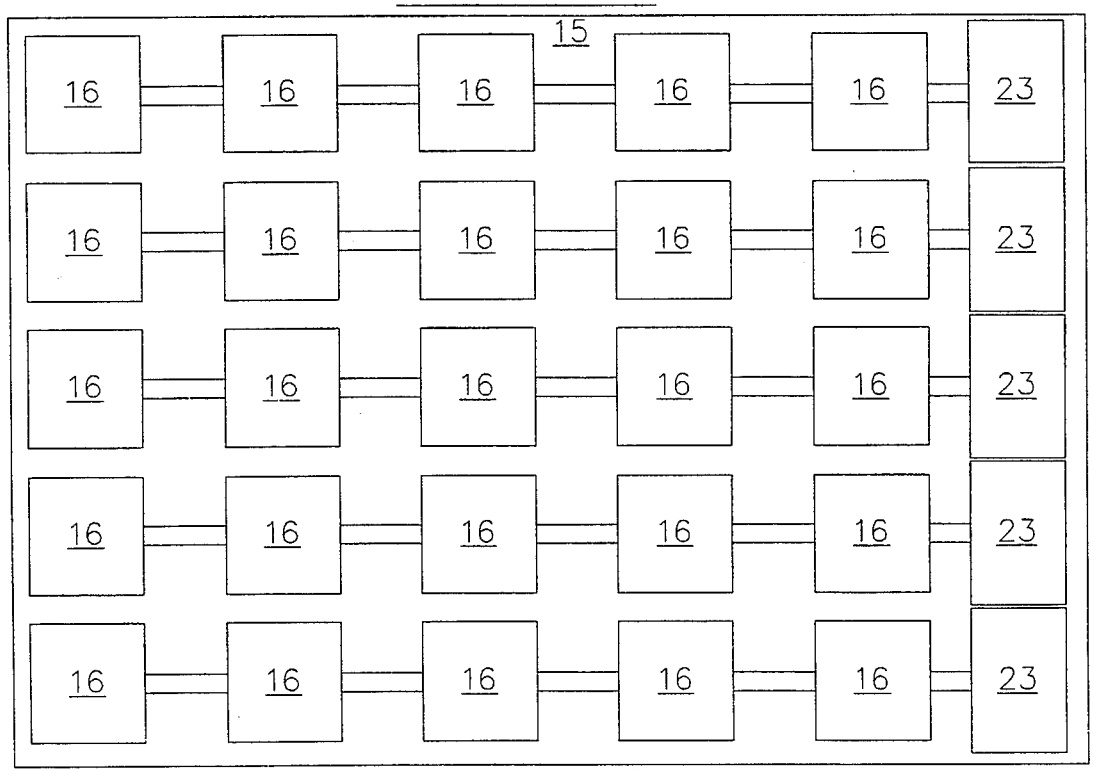

Referring to FIG. 4G, a phosphor layer 15 is deposited directly on second electrodes 11a and on top of ferroelectric layer 13, and is planarized if necessary. As shown in FIG. 4H, a third (accelerator) electrode 16 is deposited and patterned. FIG. 4I illustrates a top view of the patterned third (accelerator) electrode including third contact pads 23 which allow rows of accelerator electrodes to be selected. Preferably, a contact pad 23 is energized at the same time a contact pad 22 (FIG. 4F) is energized. However, as already described, an unpatterned accelerator electrode 16 may also be provided.

Figure 4J:
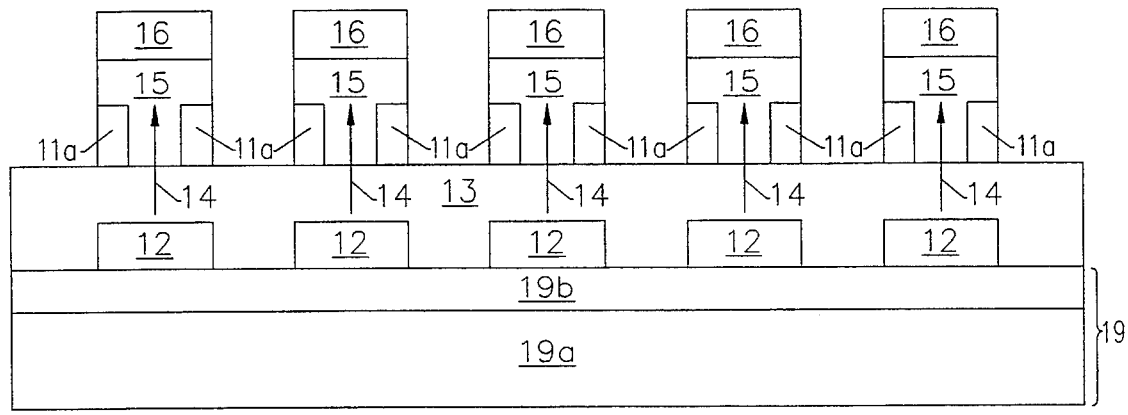

Referring now to FIG. 4J, the phosphor is etched outside the second electrodes 11a in order to improve pixel definition. In FIG. 4J, the ferroelectric layer 13 is not etched to create individual regions. However, it will be understood that ferroelectric layer etching may take place as was described in connection with FIG. 3G.

Figure 4K:
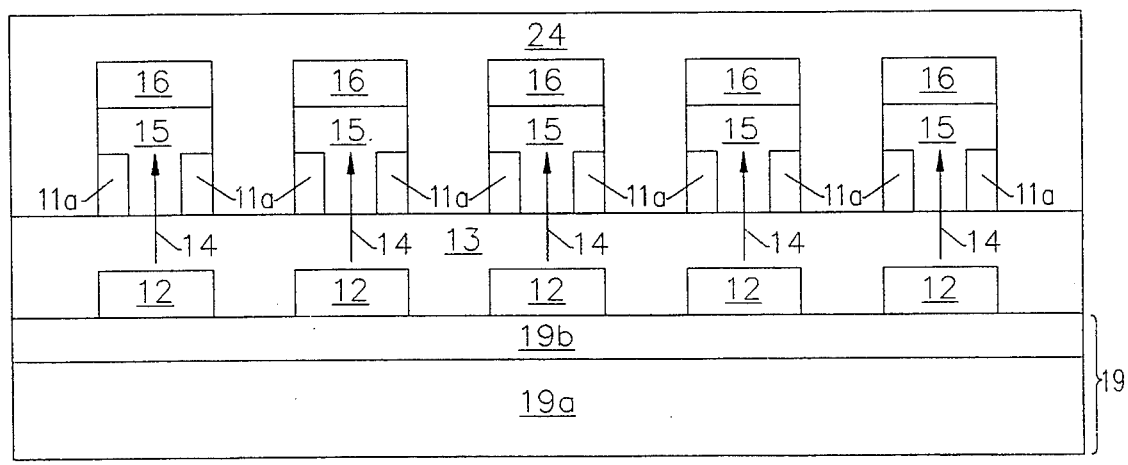

Finally, referring to FIG. 4K, a transparent glass layer or other encapsulating layer 24 is then deposited. Accordingly, the method of FIGS. 4A–4K is highly integrated because all of the layers are formed on a single substrate. The device 30 of FIG. 4K also does not require a vacuum.

Referring now to FIGS. 5A–5M, a method for fabricating fourth and fifth embodiments of a thin film ferroelectric display according to the present invention will now be described. The beginning steps for both embodiments are the same, but they end with different steps as will be described below.

In contrast with the earlier embodiments, the first and second electrodes 12 and 11 are on the sides of the thin film ferroelectric layer, relative to the substrate on which the thin film ferroelectric display is built. Thus, they extend in a direction which is transverse to the respective first and second electrode arrays. In contrast, the first and second electrodes 12 and 11 of FIGS. 3 and 4 may be regarded as top and bottom electrodes relative to the substrate. Thus, they extend in a direction which is along the respective first and second electrode arrays. Accordingly, in the devices produced according to the method of FIG. 5, electron emission does not need to pass through the second electrode so that the second electrode may be solid (unpatterned). The emission of electrons in a ferroelectric device, in a direction which is parallel to the electrodes, is described in the above identified Zang En-guan et al. article and is referred to therein as E⊥P emission.

Figure 5A:
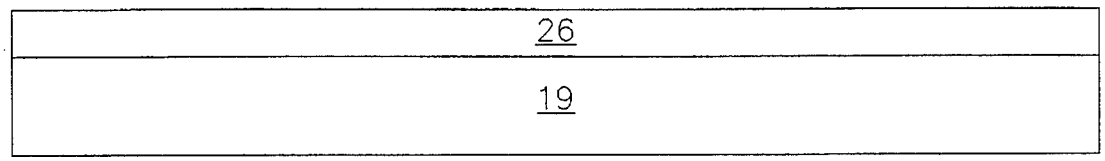
Figure 5B:
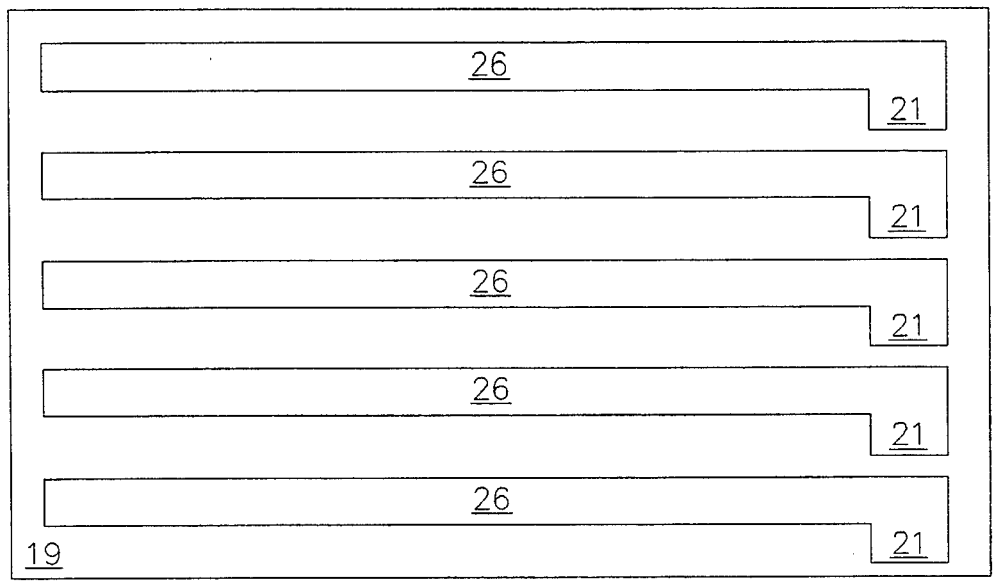

Referring to FIG. 5A, an array of connecting electrodes 26 is formed on substrate 19. FIG. 5B illustrates a top view of the connecting electrodes 26. As shown, each connecting electrode includes a contact pad 21. Connecting electrodes 26 will subsequently be used to electrically connect the first electrodes. Thus, the formation of the array of connecting electrodes 36 may be regarded as a beginning of a step of forming the first electrode array.

Figure 5C:
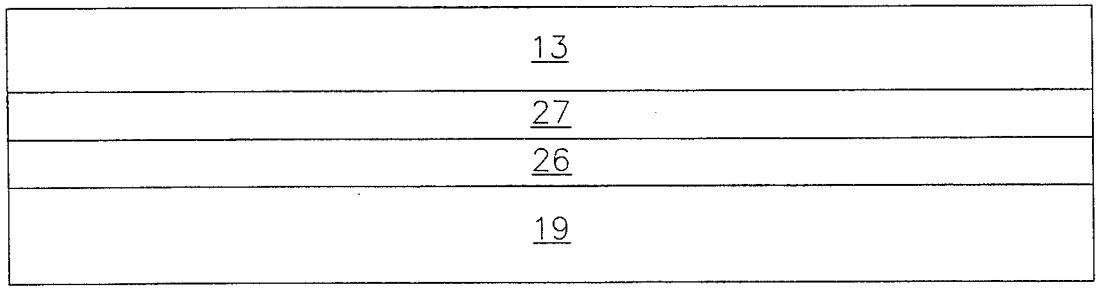

Referring to FIG. 5C, an insulating layer 27 is deposited on substrate 19 and connecting electrodes 26. For example, a layer of MgO may be formed. Insulating layer 27 serves two primary purposes. First, it insulates second electrodes 11 from the connecting electrode 26 as will be seen in FIG. 5J below. Second, it is a substrate for subsequent growth of ferroelectric thin film 13 which is deposited thereon.

Figure 5D:
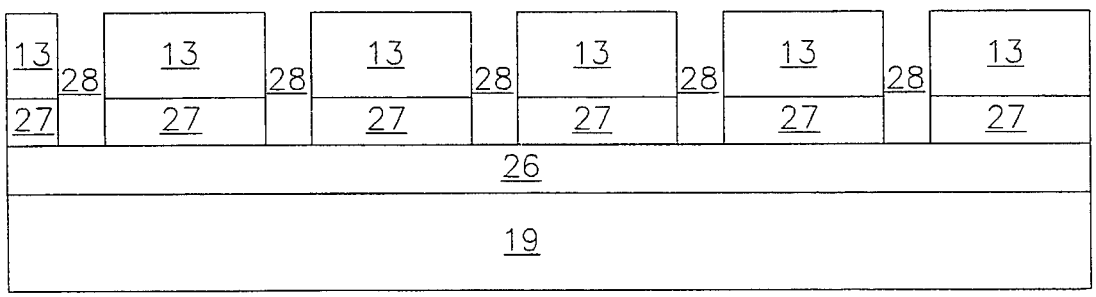
Figure 5E:
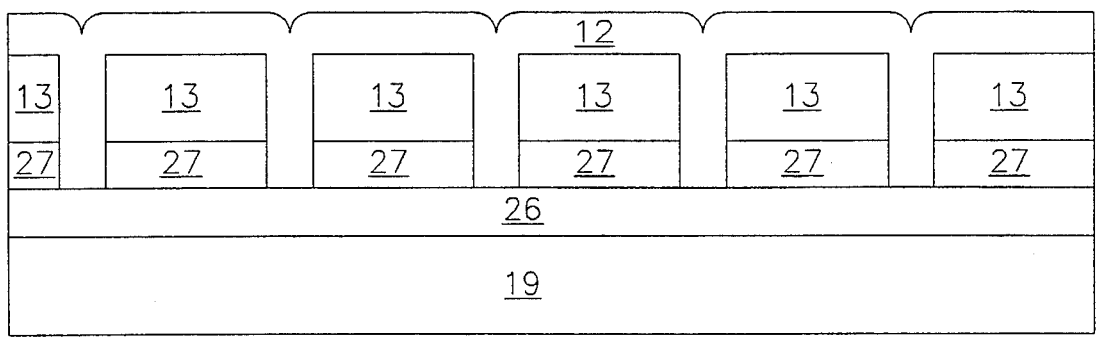
Figure 5F:
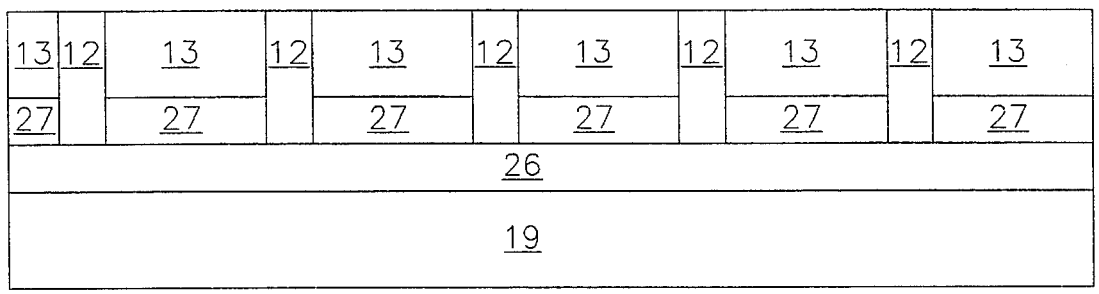
Figure 5G:
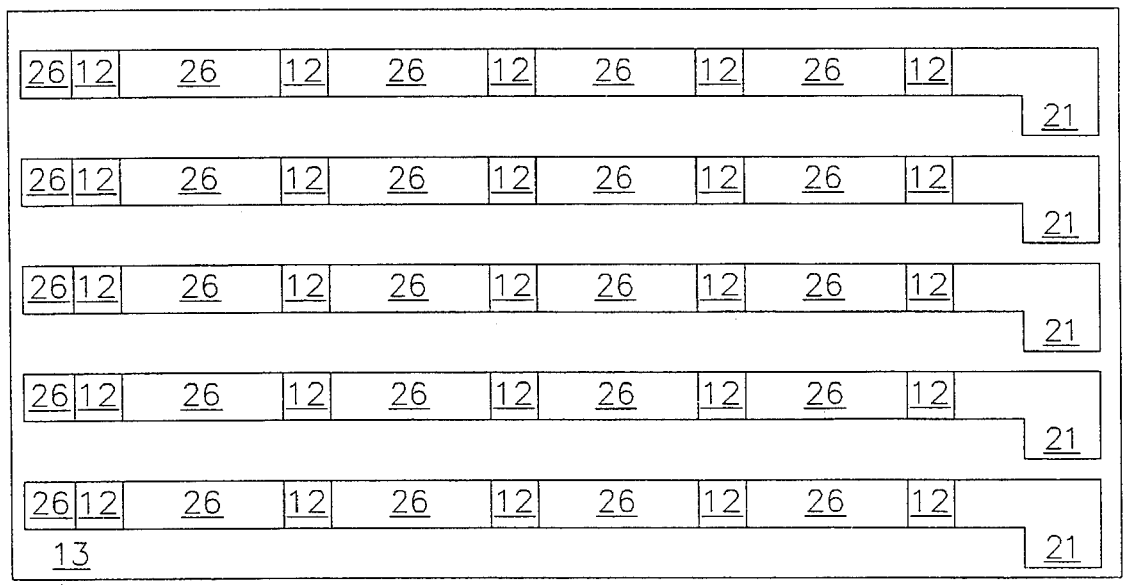

Referring now to FIG. 5D, first vias 28 are etched or otherwise formed in ferroelectric layer 13, extending through insulating layer 27. As shown in FIG. 5E, the first vias 28 are filled with first electrode material 12, and as shown in FIG. 5F, the excess electrode material is back etched. FIG. 5G illustrates a top view of the connecting electrodes 26, contact pads 21 and the first electrodes 12.

Figures 5H, 5I, 5J:
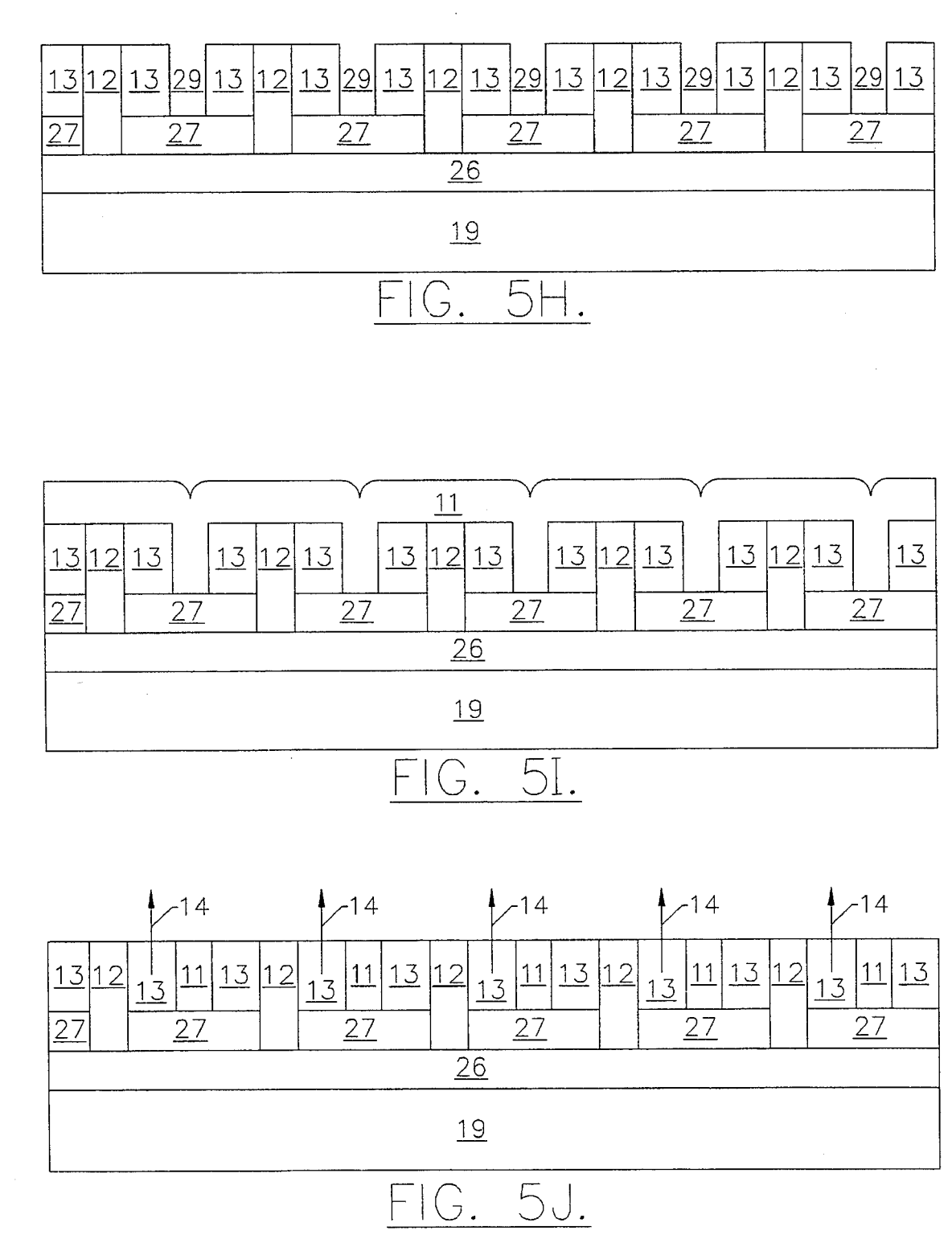
Figure 5K:
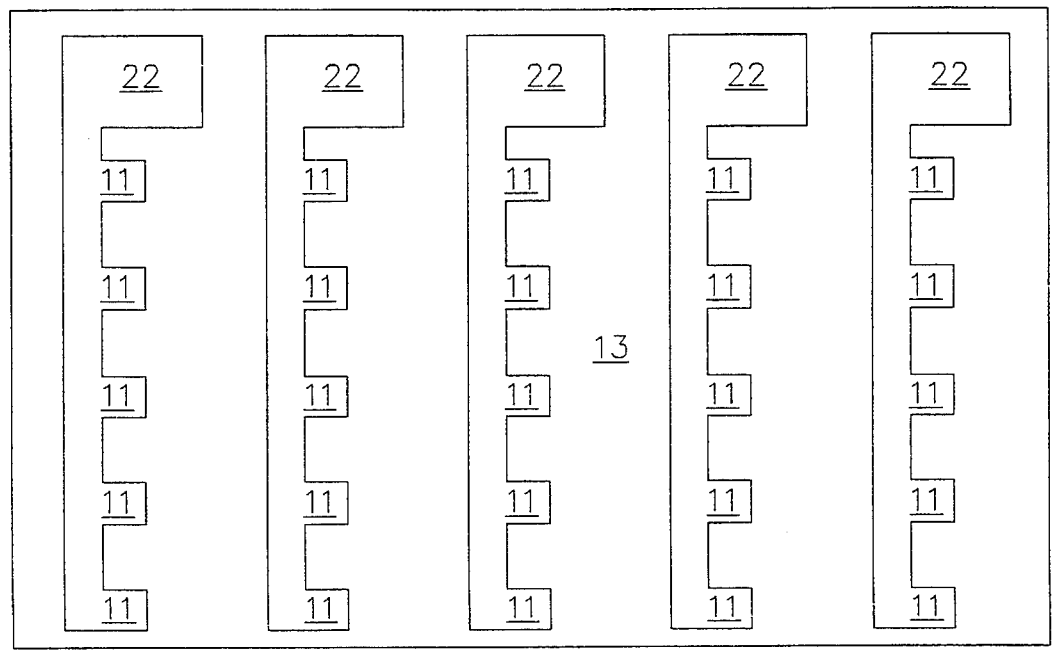

Then, referring to FIG. 5H, second vias 29 are etched in thin film ferroelectric layer 13. These vias are only etched as far as insulating layer 27. As shown in FIG. 5I, second electrode material 11 is then deposited to fill second vias 29, and as shown in FIG. 5J, the excess second electrode material is removed. Thus, as shown in FIG. 5J, first electrode 12 and second electrode 11 are side electrodes which produce electron emission in the orthogonal mode along emission paths 14. FIG. 5K illustrates a top view of second electrodes 11 including second contacts 22.

Figure 5L:
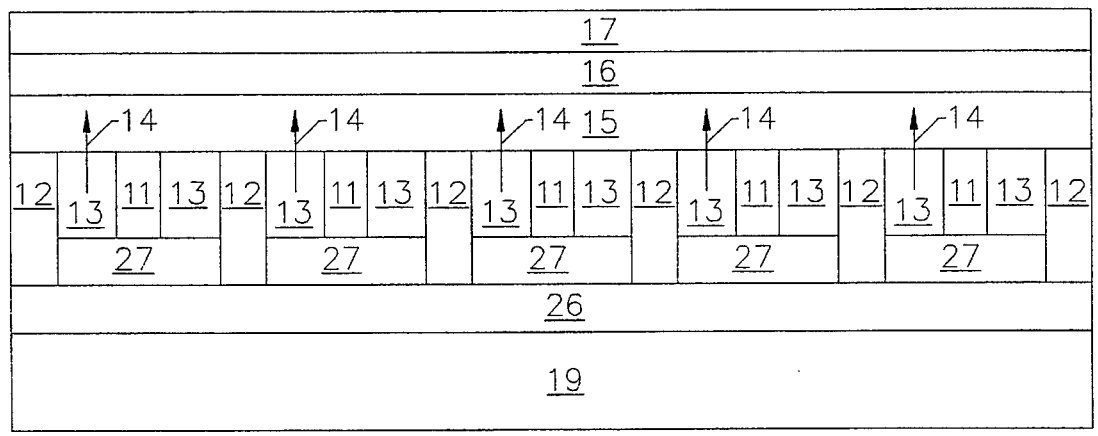
Figure 5M:
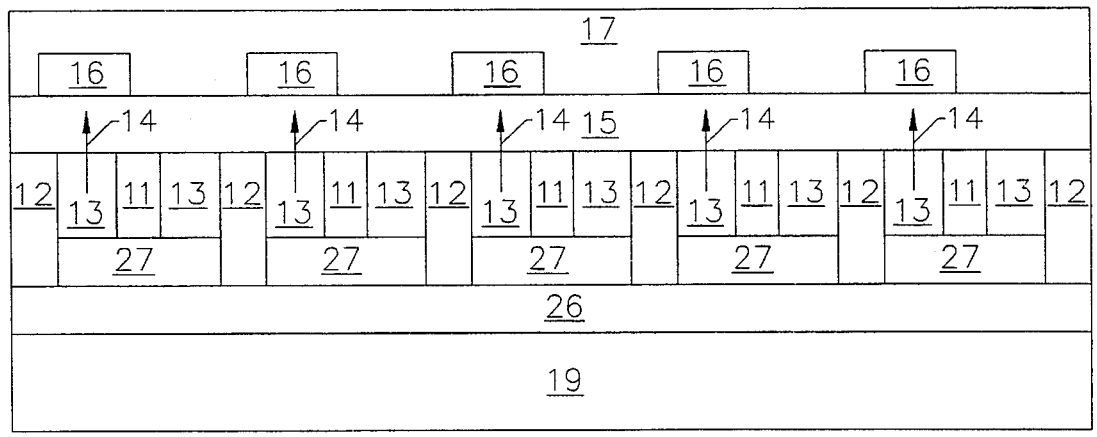

Two finishing techniques may be used to complete the fourth and fifth embodiments of the devices. As shown in FIG. 5L, device 40 may be formed by forming a third electrode 16 and phosphor layer 15 on a second substrate 17 as was illustrated in FIG. 3H, and then joining second substrate 17 to the thin film ferroelectric device as was shown in FIG. 3I. Alternatively, device 50 of FIG. 5M may be formed by depositing phosphor layer 15 on the first and second electrodes, forming and patterning the third electrode 16 and encapsulating the resulting device using an encapsulating layer 24 as was described in connection with FIGS. 4G–4K.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A flat panel display comprising:

first and second spaced apart electrodes, said first and second spaced apart electrodes producing an electric field therebetween upon application of a predetermined voltage therebetween;

a ferroelectric thin film between said first and second spaced apart electrodes, said ferroelectric thin film emitting electrons therefrom in an electron emission path upon application of said predetermined voltage between said first and second spaced apart electrodes; and a luminescent layer in said electron emission path, said luminescent layer producing luminescence upon impingement of the emitted electrons thereon.

2. A flat panel display according to claim 1 wherein said ferroelectric thin film is about 2 microns or less in thickness.

3. A flat panel display according to claim 2 wherein said ferroelectric thin film is a polycrystalline ferroelectric thin film.

4. A flat panel display according to claim 3 wherein said ferroelectric thin film is a polycrystalline ferroelectric thin film having (001) crystal orientation.

5. A flat panel display according to claim 1 wherein said luminescent layer is on said second electrode, opposite said ferroelectric thin film.

6. A flat panel display according to claim 1 wherein said luminescent layer is spaced apart from said second electrode to define a gap therebetween.

7. A flat panel display according to claim 1 further comprising a third electrode adjacent said luminescent layer, said third electrode accelerating emitted electrons from said ferroelectric thin film to said luminescent layer.

8. A flat panel display according to claim 1 wherein said ferroelectric thin film is about 2 microns or less in thickness and wherein said flat panel display further comprises means for applying a predetermined voltage of about 50 volts or less between said first and second spaced apart electrodes.

9. A flat panel display according to claim 1 wherein said second electrode is a patterned second electrode and wherein said electron emission path passes through said patterned second electrode.

10. A flat panel display according to claim 1 wherein said electron emission path is transverse to said first and second electrodes.

11. A flat panel display comprising:

first and second spaced apart electrodes, said first and second spaced apart electrodes producing an electric field therebetween upon application of a predetermined voltage therebetween;

a polycrystalline ferroelectric thin film having (001) crystal orientation and having thickness of about 2 microns or less, between said first and second spaced apart electrodes, said ferroelectric thin film emitting electrons therefrom in an electron emission path upon application of said predetermined voltage between said first and second spaced apart electrodes; and a luminescent layer in said electron emission path, said luminescent layer producing luminescence upon impingement of the emitted electrons thereon.

12. A flat panel display according to claim 11 wherein said luminescent layer is on said second electrode, opposite said ferroelectric thin film.

13. A flat panel display according to claim 11 wherein said luminescent layer is spaced apart from said second electrode to define a gap therebetween.

14. A flat panel display according to claim 11 further comprising a third electrode adjacent said luminescent layer, said third electrode accelerating emitted electrons from said ferroelectric thin film to said luminescent layer.

15. A flat panel display according to claim 11 wherein said ferroelectric thin film is about 2 microns or less in thickness and wherein said flat panel display further comprises means for applying a predetermined voltage of about 50 volts or less between said first and second spaced apart electrodes.

16. A flat panel display according to claim 11 wherein said luminescent layer includes phosphor.

17. A flat panel display according to claim 11 wherein said second electrode is a patterned second electrode and wherein said electron emission path passes through said patterned second electrode.

18. A flat panel display according to claim 11 wherein said electron emission path is transverse to said first and second electrodes.

19. A flat panel display comprising:

first and second electrode arrays, said first and second electrode arrays being spaced apart from one another to define an array of electrode pairs, said electrode pairs producing an electric field therebetween upon application of a predetermined voltage therebetween;

a ferroelectric thin film between each of said electrode pairs, said ferroelectric thin film emitting electrons therefrom in an electron emission path for each electrode pair, upon application of said predetermined voltage between said electrode pair; and a luminescent layer in said electron emission path of each electrode pair, said luminescent layer producing luminescence upon impingement of the emitted electrons thereon.

20. A flat panel display according to claim 19 wherein said ferroelectric thin film is about 2 microns or less in thickness.

21. A flat panel display according to claim 20 wherein said ferroelectric thin film is a polycrystalline ferroelectric thin film.

22. A flat panel display according to claim 21 wherein said ferroelectric thin film is a polycrystalline ferroelectric thin film having (001) crystal orientation.

23. A flat panel display according to claim 19 wherein said luminescent layer is on said second electrode array, opposite said ferroelectric thin film.

24. A flat panel display according to claim 19 wherein said luminescent layer is spaced apart from said second electrode array to define a gap therebetween.

25. A flat panel display according to claim 19 further comprising a third electrode adjacent said luminescent layer, said third electrode accelerating emitted electrons from said ferroelectric thin film to said luminescent layer.

26. A flat panel display according to claim 19 wherein said ferroelectric thin film is about 2 microns or less in thickness and wherein said flat panel display further comprises means for applying a predetermined voltage of about 50 volts or less between said first and second spaced apart electrodes.

27. A flat panel display according to claim 19 wherein the electrodes in said second electrode array are patterned electrodes and wherein said electron emission path from each electrode pair passes through the corresponding patterned electrode.

28. A flat panel display according to claim 27 wherein each of said electrodes in said first and second arrays extend in a direction along the respective first and second arrays, to form top and bottom electrode pairs.

29. A flat panel display according to claim 19 wherein said electron emission path from each electrode pair is parallel to said first and second electrodes of the corresponding electrode pair.

30. A flat panel display according to claim 29 wherein each of said electrodes in said first and second arrays extend in a direction transverse to the respective first and second arrays, to form side electrode pairs.

31. A visible image displaying method comprising the steps of:

applying a voltage of about fifty volts or less across a ferroelectric thin film of about two microns or less in thickness, to produce electron emission from said ferroelectric thin film; and impinging the emitted electrons onto a luminescent layer to produce luminescence.

32. A method according to claim 31 wherein said applying step comprises the step of applying a voltage of about fifty volts or less across a polycrystalline ferroelectric thin film having (001) crystal orientation.

33. A method according to claim 31 wherein said impinging step comprises the step of impinging the emitted electrons from said ferroelectric thin film, across a gap and onto said luminescent layer.

34. A method according to claim 31 wherein the following step is preformed between said applying step and said impinging step:

accelerating the emitted electrons from said ferroelectric layer to said luminescent layer.

35. A method of fabricating a flat panel display comprising the steps of:

forming a first electrode array on a substrate;

forming a polycrystalline ferroelectric thin film on said first electrode array;

forming a second electrode array on said polycrystalline ferroelectric thin film to define an electron emission path from said polycrystalline ferroelectric thin film upon application of a predetermined voltage between said first and second electrode arrays; and forming a luminescent layer in said electron emission path such that said luminescent layer produces luminescence upon impingement of electrons thereon.

36. A method according to claim 35:

wherein said step of forming a first electrode array on a substrate comprises the step of forming a connecting electrode array on the substrate;

wherein the step of forming a polycrystalline ferroelectric thin film is followed by the step of forming a plurality of first electrodes in said polycrystalline ferroelectric thin film, electrically contacting connecting electrode array; and wherein the step of forming a second electrode array comprises the step of forming a second electrode array in said polycrystalline ferroelectric thin film, such that said first electrodes and said second electrode array form pairs of side electrodes for said flat panel display.

37. A method according to claim 35 wherein said step of forming a polycrystalline ferroelectric thin film comprises the step of forming a highly oriented polycrystalline ferroelectric thin film.

38. A method according to claim 35 wherein said step of forming a second electrode array is followed by the step of removing said polycrystalline ferroelectric layer between adjacent electrodes of said second electrode array.

39. A method according to claim 35 wherein said step of forming a luminescent layer comprises the steps of:

forming a luminescent layer on a second substrate; and mounting said second substrate adjacent said luminescent layer.

40. A method according to claim 39 wherein said mounting step comprises the step of mounting said second substrate adjacent, and spaced apart from, said luminescent layer.

41. A method according to claim 35 wherein said step of forming a luminescent layer comprises the step of forming an luminescent layer on said polycrystalline thin film ferroelectric layer.

* * * * *